United States Patent
Jiang et al.

(10) Patent No.: US 9,883,453 B2
(45) Date of Patent: Jan. 30, 2018

(54) METHOD AND APPARATUS FOR TERMINAL TO CAMP ON CELL, AND MOBILE TERMINAL

(71) Applicant: HUAWEI DEVICE (DONGGUAN) CO., LTD., Dongguan (CN)

(72) Inventors: Yinqing Jiang, Wuhan (CN); Li Shen, Beijing (CN); Xiaojian Liu, Wuhan (CN); Bei Dai, Wuhan (CN)

(73) Assignee: HUAWEI DEVICE (DONGGUAN) CO., LTD., Dongguan (CN)

(*) Notice: Subject to any disclaimer, the term of this patent is extended or adjusted under 35 U.S.C. 154(b) by 0 days.

(21) Appl. No.: 15/033,549

(22) PCT Filed: Oct. 30, 2013

(86) PCT No.: PCT/CN2013/086256
§ 371 (c)(1),
(2) Date: Apr. 29, 2016

(87) PCT Pub. No.: WO2015/061997
PCT Pub. Date: May 7, 2015

(65) Prior Publication Data
US 2016/0255576 A1 Sep. 1, 2016

(51) Int. Cl.
*H04W 4/00* (2009.01)
*H04W 48/20* (2009.01)
(Continued)

(52) U.S. Cl.
CPC ........... *H04W 48/20* (2013.01); *H04W 24/02* (2013.01); *H04W 48/16* (2013.01); *H04W 4/00* (2013.01)

(58) Field of Classification Search
CPC ..... H04W 48/20; H04W 24/02; H04W 48/16; H04W 4/00
(Continued)

(56) References Cited

U.S. PATENT DOCUMENTS 8,825,047 B2  9/2014  Saini et al.
8,885,575 B2  11/2014  Yu et al.
(Continued)

FOREIGN PATENT DOCUMENTS

CN  101325757 A  12/2008
CN  101637048 A  1/2010
CN  102204344 A  9/2011

OTHER PUBLICATIONS

Partial English Translation and Abstract of Chinese Patent Application No. CN101325757, May 12, 2016, 8 pages.
(Continued)

*Primary Examiner* — Mong-Thuy Tran
(74) *Attorney, Agent, or Firm* — Conley Rose, P.C.

(57) ABSTRACT

Embodiments of the present disclosure disclose a method for a terminal to camp on a cell. A method for a terminal to camp on a cell includes acquiring, by a mobile terminal, a signal of an available cell, where when the mobile terminal is not camped on a serving cell, the signal of the available cell includes a signal, detected by the mobile terminal, of the cell, or when the mobile terminal camps on the serving cell, the signal of the available cell includes a signal of the serving cell and a signal of a neighboring cell of the serving cell. When a cell signal value of the available cell meets a standard cell access criterion, selecting, by the mobile terminal according to a signal strength and a historical camp-on success rate, an effective cell from the available cell, and camping, by the mobile terminal, on the effective cell.

12 Claims, 8 Drawing Sheets

(51) Int. Cl.
*H04W 24/02* (2009.01)
*H04W 48/16* (2009.01)

(58) Field of Classification Search
USPC .................................................. 455/434, 436
See application file for complete search history.

(56) References Cited

U.S. PATENT DOCUMENTS

| | | | |
|---|---|---|---|
| 9,232,512 B2 | 1/2016 | Yu et al. | |
| 9,313,730 B2 | 4/2016 | McCann et al. | |
| 2007/0223510 A1* | 9/2007 | Joo | H04W 36/0088 370/436 |
| 2010/0035601 A1* | 2/2010 | Chen | H04W 4/20 455/423 |
| 2010/0113010 A1* | 5/2010 | Tenny | H04L 12/66 455/423 |
| 2010/0232346 A1 | 9/2010 | Yu et al. | |
| 2011/0117951 A1* | 5/2011 | Lee | H04W 72/02 455/513 |
| 2012/0275371 A1 | 11/2012 | Somasundaram et al. | |
| 2013/0064176 A1* | 3/2013 | Hsu | H04W 4/02 370/328 |
| 2013/0109372 A1* | 5/2013 | Ekici | H04W 24/02 455/422.1 |
| 2013/0188499 A1* | 7/2013 | Mach | H04W 48/20 370/252 |
| 2013/0258934 A1 | 10/2013 | Amerga et al. | |
| 2013/0324132 A1* | 12/2013 | Morad | H04W 24/08 455/438 |
| 2013/0337799 A1* | 12/2013 | Ekici | H04W 48/20 455/423 |
| 2015/0139187 A1* | 5/2015 | Arunachalam | H04W 36/24 370/331 |
| 2016/0113004 A1 | 4/2016 | Yu et al. | |
| 2016/0192288 A1 | 6/2016 | McCann et al. | |

OTHER PUBLICATIONS

Partial English Translation and Abstract of Chinese Patent Application No. CN102204344, May 12, 2016, 6 pages.
Foreign Communication From a Counterpart Application, PCT Application No. PCT/CN2013/086256, English Translation of International Search Report dated Aug. 5, 2014, 2 pages.
Foreign Communication From a Counterpart Application, PCT Application No. PCT/CN2013/086256, English Translation of Written Opinion dated Aug. 5, 2014, 13 pages.

* cited by examiner

METHOD AND APPARATUS FOR TERMINAL TO CAMP ON CELL, AND MOBILE TERMINAL

CROSS-REFERENCE TO RELATED APPLICATIONS

This application is a U.S. National Stage of International Application No. PCT/CN2013/086256, filed on Oct. 30, 2013, which is hereby incorporated by reference in its entirety.

TECHNICAL FIELD

The present disclosure relates to the field of communications, and in particular, to a method and an apparatus for a terminal to camp on a cell, and a mobile terminal.

BACKGROUND

Currently, a mobile terminal searches a cell network to find a cell that can be camped on and acquires a network service through camping. When the mobile terminal enters a network coverage area from a network coverage hole, the mobile terminal traverses all frequency bands allowed by a Public Land Mobile Network (PLMN) and selects a suitable cell to camp on. This process is referred to as cell selection.

The cell on which the mobile terminal camps is referred to as a serving cell. In the prior art, the mobile terminal periodically performs reselection detection. For example, the mobile terminal monitors, according to a cell reselection neighboring cell frequency band configuration table indicated by a Broadcast Control Channel (BCCH) system message of the serving cell, all neighboring cell levels and neighboring cell synchronization messages in the table that are received by a BCCH carrier, sorts the received neighboring cell levels in descending order, and extracts all types of system messages and control messages in each neighboring cell. When a comprehensive condition of a neighboring cell in the table is superior to that of the current serving cell, the mobile terminal reselects this neighboring cell as a new serving cell. This process is referred to as cell reselection. When a comprehensive condition of any neighboring cell is inferior to that of the current serving cell, the mobile terminal chooses to still camp on the serving cell, and does not reselect a neighboring cell.

Several problems occur during processes in which the mobile terminal performs cell selection and cell reselection. For example, when the mobile terminal selects a cell for the first time, if there is no suitable cell to camp on in all frequency bands allowed by the PLMN, the mobile terminal directly enters a no-service state. In addition, when the mobile terminal periodically performs cell reselection detection, if there is no suitable neighboring cell for the mobile terminal to camp on and the current serving cell does not meet a connection requirement due to worsened network coverage, the mobile terminal is dropped from the network.

SUMMARY

Embodiments of the present disclosure provide a method and an apparatus for a terminal to camp on a cell, and a mobile terminal such that a mobile terminal can camp on a cell, thereby facilitating network service provisioning to a user. To achieve the foregoing objectives, the following technical solutions are used in the embodiments of the present disclosure.

According to a first aspect, a method for a terminal to camp on a cell is provided, the method including the following steps: acquiring, by a mobile terminal, a signal of an available cell, where when the mobile terminal is not camped on a serving cell, the signal of the available cell includes a signal, detected by the mobile terminal, of a cell, or when the mobile terminal camps on the serving cell, the signal of the available cell includes a signal of the serving cell and a signal of a neighboring cell of the serving cell, if a cell signal value of the available cell meets a standard cell access criterion, selecting, by the mobile terminal, an effective cell from the available cell according to signal strength and a historical camp-on success rate, and camping, by the mobile terminal, on the effective cell.

With reference to the first aspect, in a first possible implementation manner of the first aspect, selecting an effective cell from the available cell according to signal strength and a historical camp-on success rate includes acquiring, by the mobile terminal, a historically camped-on cell recorded locally, obtaining an intersection set of the historically camped-on cell and the available cell, to obtain a candidate cell set, obtaining an access feasibility coefficient of each cell in the candidate cell set according to a signal value and a historical camp-on success rate of each cell in the candidate cell set, where Historical camp-on success rate=a quantity of camp-on successes/(a quantity of camp-on failures+the quantity of camp-on successes), and selecting a cell with a highest access feasibility coefficient as the effective cell.

With reference to the first possible implementation manner of the first aspect, in a second possible implementation manner of the first aspect, the method further includes, when the mobile terminal camps on a cell successfully for a first time, recording the camped-on cell on which the mobile terminal successfully camps, and setting a quantity of camp-on successes for the camped-on cell to 1, each time the camped-on cell is successfully camped on, adding 1 to a quantity of camp-on successes for the camped-on cell, and each time the camped-on cell fails to be camped on, adding 1 to a quantity of camp-on failures for the camped-on cell.

With reference to the first aspect, in a third possible implementation manner of the first aspect, the method further includes, if the cell signal value of the available cell does not meet the standard cell access criterion, identifying the available cell that does not meet the standard cell access criterion, if no cell whose cell signal value meets the standard cell access criterion is found after all cells are traversed, using the identified cell as the effective cell, and combining, by the mobile terminal, a compensation value with the signal value of the effective cell, and camping on the effective cell, where the compensation value is preset in the mobile terminal.

According to a second aspect, a method for a terminal to camp on a cell includes acquiring, by a mobile terminal, a signal of a serving cell and a signal of a neighboring cell, if a signal value of the serving cell meeting a standard cell access criterion or a signal value of the neighboring cell meeting a standard access criterion exists, selecting, by the mobile terminal, a cell, of the serving cell or the neighboring cell, with an optimal signal as an effective cell, or if no signal value of the serving cell meeting a standard cell access criterion and no signal value of the neighboring cell meeting the standard cell access criterion exists, selecting a cell signal value from a signal value of the serving cell and a signal value of the neighboring cell for compensation value combination estimation to obtain an effective cell, and combining, by the mobile terminal, the corresponding compensation value with the signal value of the effective cell, and camping on the effective cell.

With reference to the second aspect, in a first possible implementation manner of the second aspect, selecting a cell signal value from a signal value of the serving cell and a signal value of the neighboring cell for compensation value combination estimation to obtain an effective cell includes separately combining a corresponding compensation value with the signal value of the neighboring cell to obtain a combined neighboring cell signal value set, where the compensation value is preset in the mobile terminal, selecting a greatest combined neighboring cell signal value whose signal value is the greatest from the combined neighboring cell signal value set, combining a corresponding compensation value with the signal value of the serving cell to obtain a combined serving cell signal value, if the combined serving cell signal value is greater than the greatest combined neighboring cell signal value and meets the standard cell access criterion, selecting, by the mobile terminal, the serving cell that corresponds to the combined serving cell signal value as the effective cell, and if the greatest combined neighboring cell signal value is greater than the combined serving cell signal value and meets the standard cell access criterion, using, by the mobile terminal, the neighboring cell that corresponds to the greatest combined neighboring cell signal value as the effective cell.

With reference to the first possible implementation manner of the second aspect, in a second possible implementation manner of the second aspect, the method further includes, if neither the greatest combined neighboring cell signal nor the combined serving cell signal meets the standard cell access criterion, entering, by the mobile terminal, a no-service state.

According to a third aspect, an apparatus for a terminal to camp on a cell includes an acquiring unit configured to acquire a signal of an available cell, where when a mobile terminal is not camped on a serving cell, the signal of the available cell includes a signal, detected by the mobile terminal, of a cell; or when the mobile terminal camps on the serving cell, the signal of the available cell includes a signal of the serving cell and a signal of a neighboring cell of the serving cell, a selection unit configured to, if a cell signal value of the available cell meets a standard cell access criterion, select an effective cell from the available cell according to signal strength and a historical camp-on success rate, and a camping unit configured to camp on the effective cell.

With reference to the third aspect, in a first possible implementation manner of the third aspect, the selection unit includes an acquiring subunit configured to acquire a historically camped-on cell recorded locally, an intersection set selection subunit configured to obtain an intersection set of the historically camped-on cell acquired by the acquiring subunit and the available cell to obtain a candidate cell set, an access feasibility coefficient acquiring subunit configured to obtain an access feasibility coefficient of each cell in the candidate cell set according to a signal value and a historical camp-on success rate of each cell in the candidate cell set, where Historical camp-on success rate=a quantity of camp-on successes/(a quantity of camp-on failures+the quantity of camp-on successes), and an effective cell selection subunit configured to select a cell with a highest access feasibility coefficient as the effective cell.

With reference to the first possible implementation manner of the third aspect, in a second possible implementation manner of the third aspect, the apparatus further includes a recording unit configured to, when the mobile terminal camps on a cell successfully for a first time, record the camped-on cell on which the mobile terminal successfully camps and set a quantity of camp-on successes for the camped-on cell to 1, and an accumulation unit configured to, each time the camped-on cell is successfully camped on, add 1 to a quantity of camp-on successes for the camped-on cell, where the accumulation unit is further configured to, each time the camped-on cell fails to be camped on, add 1 to a quantity of camp-on failures for the camped-on cell.

With reference to the third aspect, in a third possible implementation manner of the third aspect, the apparatus further includes an identifying unit configured to, when the cell signal value of the available cell does not meet the standard cell access criterion, identify the available cell that does not meet the standard cell access criterion, where the selection unit is further configured to, when no cell whose cell signal value meets the standard cell access criterion is found after all cells are traversed, use the identified cell as the effective cell, and the camping unit is further configured to combine a compensation value with the signal value of the effective cell and camp on the effective cell, where the compensation value is preset in the mobile terminal.

According to a fourth aspect, an apparatus for a terminal to camp on a cell includes an acquiring unit configured to acquire a signal of a serving cell and a signal of a neighboring cell, a selection unit configured to, when a signal value of the serving cell meeting a standard cell access criterion or a signal value of the neighboring cell meeting a standard access criterion exists, use a cell of the serving cell or the neighboring cell with an optimal signal as an effective cell, wherein the effective cell is configured to, when no signal value of the serving cell meeting a standard cell access criterion and no signal value of the neighboring cell meeting the standard cell access criterion exists, select a cell signal value from a signal value of the serving cell and a signal value of the neighboring cell for compensation value combination estimation to obtain an effective cell, and a camping unit configured to combine the corresponding compensation value with the signal value of the effective cell and camp on the effective cell.

With reference to the fourth aspect, in a first possible implementation manner of the fourth aspect, the combination unit includes a compensation subunit configured to separately combine a corresponding compensation value with the signal value of the neighboring cell to obtain a combined neighboring cell signal value set, where the compensation value is preset in the mobile terminal, a selection subunit configured to select a greatest combined neighboring cell signal value whose signal value is the greatest from the combined neighboring cell signal value set obtained by the compensation subunit, where the compensation subunit is further configured to combine a corresponding compensation value with the signal value of the serving cell to obtain a combined serving cell signal value, and a first effective cell selection subunit configured to, when the combined serving cell signal value is greater than the greatest combined neighboring cell signal value and meets the standard cell access criterion, select the serving cell that corresponds to the combined serving cell signal value as the effective cell, where the first effective cell selection subunit is further configured to, when the greatest combined neighboring cell signal value is greater than the combined serving cell signal value and meets the standard cell access criterion, use the neighboring cell that corresponds to the greatest combined neighboring cell signal value as the effective cell.

With reference to the first possible implementation manner of the fourth aspect, in a second possible implementation manner of the fourth aspect, if neither the greatest combined neighboring cell signal nor the combined serving cell signal meets the standard cell access criterion, the mobile terminal enters a no-service state.

According to a fifth aspect, a mobile terminal includes a receiver configured to acquire a signal of an available cell, where when the mobile terminal is not camped on a serving cell, the signal of the available cell includes a signal, detected by the mobile terminal of a cell, or when the mobile terminal camps on the serving cell, the signal of the available cell includes a signal of the serving cell and a signal of a neighboring cell of the serving cell, and a processor, configured to, if a cell signal value of the available cell meets a standard cell access criterion, select an effective cell from the available cell according to signal strength and a historical camp-on success rate, where the processor is further configured to make the mobile terminal camp on the effective cell.

With reference to the fifth aspect, in a first possible implementation manner of the fifth aspect, the processor is further configured to acquire a historically camped-on cell recorded locally, obtain an intersection set of the historically camped-on cell and the available cell, to obtain a candidate cell set, obtain an access feasibility coefficient of each cell in the candidate cell set according to a signal value and a historical camp-on success rate of each cell in the candidate cell set, where Historical camp-on success rate=a quantity of camp-on successes/(a quantity of camp-on failures+the quantity of camp-on successes), and select a cell with a highest access feasibility coefficient as the effective cell.

With reference to the first possible implementation manner of the fifth aspect, in a second possible implementation manner of the fifth aspect, the processor is further configured to, when the mobile terminal camps on a cell successfully for a first time, record the camped-on cell on which the mobile terminal successfully camps, and set a quantity of camp-on successes for the camped-on cell to 1, and the processor is further configured to, each time the camped-on cell is successfully camped on, add 1 to a quantity of camp-on successes for the camped-on cell, and each time the camped-on cell fails to be camped on, add 1 to a quantity of camp-on failures for the camped-on cell.

With reference to the fifth aspect, in a third possible implementation manner of the fifth aspect, the processor is further configured to, when the cell signal value of the available cell does not meet the standard cell access criterion, identify the available cell that does not meet the standard cell access criterion, when no cell whose cell signal value meets the standard cell access criterion is found after all cells are traversed, use the identified cell as the effective cell, and combine a compensation value with the signal value of the effective cell, and camp on the effective cell, where the compensation value is preset in the mobile terminal.

According to a sixth aspect, a mobile terminal includes a receiver configured to receive a signal of a serving cell and a signal of a neighboring cell, and a processor configured to, when a signal value, of the serving cell, meeting a standard cell access criterion or a signal value, of the neighboring cell meeting a standard access criterion exists, use a cell, of the serving cell or the neighboring cell, with an optimal signal as an effective cell, where the processor is further configured to when no signal value of the serving cell meeting a standard cell access criterion and no signal value of the neighboring cell meeting the standard cell access criterion exists, select a cell signal value from a signal value of the serving cell and a signal value of the neighboring cell for compensation value combination estimation, to obtain an effective cell, and the processor is further configured to combine the corresponding compensation value with the signal value of the effective cell, and make the mobile terminal camp on the effective cell, where the corresponding compensation value is combined with a cell signal of the effective cell for the mobile terminal to camp on.

With reference to the sixth aspect, in a first possible implementation manner of the sixth aspect, the processor is specifically configured to separately combine a corresponding compensation value with the signal value of the neighboring cell to obtain a combined neighboring cell signal value set, where the compensation value is preset in the mobile terminal, select a greatest combined neighboring cell signal value whose signal value is the greatest from the combined neighboring cell signal set value, combine a corresponding compensation value with the signal value of the serving cell, to obtain a combined serving cell signal value; if the combined serving cell signal value is greater than the greatest combined neighboring cell signal value and meets the standard cell access criterion, select the serving cell that corresponds to the combined serving cell signal value as the effective cell, and if the greatest combined neighboring cell signal value is greater than the combined serving cell signal value and meets the standard cell access criterion, use the neighboring cell that corresponds to the greatest combined neighboring cell signal value as the effective cell.

With reference to the first possible implementation manner of the sixth aspect, in a second possible implementation manner of the sixth aspect, the processor is further configured to, when neither the greatest combined neighboring cell signal nor the combined serving cell signal meets the standard cell access criterion, make the mobile terminal enter a no-service state.

According to the method and the apparatus for a terminal to camp on a cell, and the mobile terminal that is provided in the embodiments of the present disclosure, a mobile terminal acquires a signal of an available cell, and when a cell signal value of the available cell meets a standard cell access criterion, the mobile terminal selects, with reference to signal strength and a historical camp-on success rate, an effective cell from the available cell to camp on such that when the mobile terminal selects a cell for a first time or reselects a cell, a success rate of finding a cell that can be camped on is improved, and a possibility of making the mobile terminal enter a no-service state is reduced, thereby facilitating network service provisioning to a user.

DESCRIPTION OF EMBODIMENTS

The method, apparatus, and mobile terminal provided in the embodiments of the present disclosure are described in detail below with reference to the accompanying drawings. The described embodiments are merely some, but not all, of the embodiments of the present disclosure. All other embodiments obtained by a person of ordinary skill in the art based on the embodiments of the present disclosure without creative efforts shall fall within the protection scope of the present disclosure.

Figure 1A:
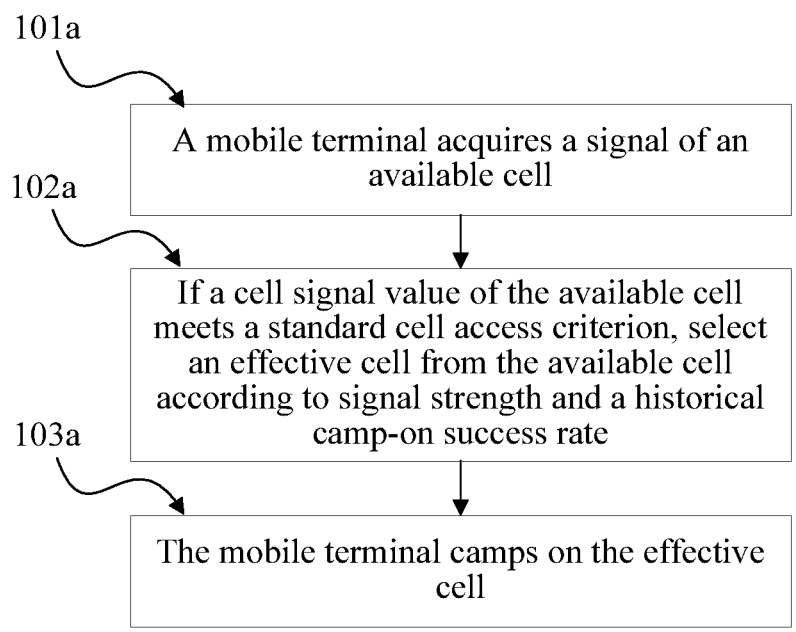
FIG. 1A is a flowchart of a method for a terminal to camp on a cell according to an embodiment of the present disclosure.

An embodiment of the present disclosure provides a method for a terminal to camp on a cell. As shown in FIG. 1A, the method includes the following steps.

101A. A mobile terminal acquires a signal of an available cell.

102A. If a cell signal value of the available cell meets a standard cell access criterion, select an effective cell from the available cell according to a signal strength and a historical camp-on success rate.

It should be noted that when the mobile terminal is not camped on a serving cell, the signal of the available cell includes a signal, detected by the mobile terminal, of a cell. Alternatively, when the mobile terminal is camped on the serving cell, the signal of the available cell includes a signal of the serving cell and a signal of a neighboring cell of the serving cell.

For example, a Squal criterion is defined in a Wideband Code Division Multiple Access (WCDMA) system, and a C1 criterion is defined in a Global System for Mobile Communications (GSM). If the cell signal value meets the Squal criterion or the C1 criterion, the cell signal value meets the standard cell access criterion, and in this case, the mobile terminal uses the cell that meets the standard cell access criterion as the effective cell.

For details of the Squal criterion, refer to subclause 5.2.3.1.2 in the 3gppprotocolTS 25.304, and for details of the C1 criterion, refer to subclause 6.4 in the 3gpp protocol TS05.08, both of which are hereby incorporated by reference in their entirety.

103a. The mobile terminal camps on the effective cell.

According to the method for a terminal to camp on a cell provided in this embodiment of the present disclosure, a mobile terminal acquires a signal of an available cell, and when a cell signal value of the available cell meets a standard cell access criterion for a standard cell signal, the mobile terminal selects, based on a signal strength and a historical camp-on success rate, an effective cell from the available cell to camp on such that when the mobile terminal selects a cell for a first time or reselects a cell, a success rate of finding a cell that can be camped on is improved, and a possibility of making the mobile terminal enter a no-service state is reduced, thereby facilitating network service provisioning to a user.

In particular, in areas with relatively heavy traffic, even though signal coverage is favorable in these areas, a situation of poor call quality may still exist. In this case, an embodiment of the present disclosure selects an effective cell with reference to two factors, that is, signal strength and a historical camp-on success rate to improve a cell access success rate of a mobile terminal and improve call quality.

Figure 4:
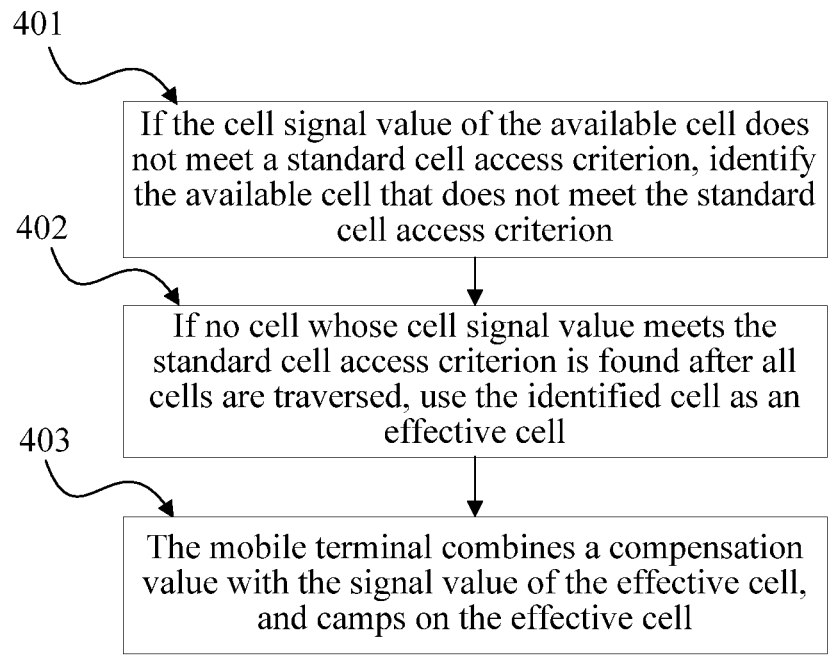
FIG. 4 is a flowchart of another method for a terminal to camp on a cell according to an embodiment of the present disclosure.

Further, if the cell signal value of the available cell cannot meet the standard cell access criterion, an embodiment of the present disclosure further provides a method for a terminal to camp on a cell, which, as shown in FIG. 4, includes the following steps.

401. If the cell signal value of the available cell does not meet the standard cell access criterion, identify the available cell that does not meet the standard cell access criterion.

A mobile terminal may detect signals of multiple available cells. There are many match conditions for cell access, where that signal strength meets the standard cell access criterion is one match condition, and there may be another match condition. For example, the other match condition is a PLMN of a network. For example, if the mobile terminal uses a China Mobile subscriber identity module (SIM) card, in multiple received cell signals, a cell of a China Mobile GSM network (whose PLMN value is 460-0) is used as a cell that meets the match condition, and a cell signal of another network is not considered.

Before step 401, the mobile terminal has performed detection of the other match condition on a signal of the available cell, and determined that the signal of the cell meets the other match condition.

402. If no cell whose cell signal value meets the standard cell access criterion is found after all cells are traversed, use the identified cell as the effective cell.

According to the description in 401, the mobile terminal has identified the cell. According to the description in 402, if the mobile terminal does not find a cell that meets the standard cell access criterion after traversing the cells, in order to prevent the mobile terminal from entering a no-service state, the mobile terminal uses the cell identified in 401 as a serving cell. If no identified cell exists, the mobile terminal enters the no-service state.

403. The mobile terminal combines a compensation value with the signal value of the effective cell, and camps on the effective cell.

To ensure signal strength, a corresponding compensation value is combined with the cell signal value of the effective cell such that the effective cell provides a reliable network service for the mobile terminal, where the compensation value is preset in the mobile terminal.

If there are multiple effective cells, an effective cell that is first found may be selected to camp on.

For description of the combination, reference may be made to step 304.

According to the method for a terminal to camp on a cell provided in this embodiment of the present disclosure, a mobile terminal identifies an available cell that does not meet a standard cell access criterion and obtains an effective signal by combining a compensation value with a signal of the identified cell in order to camp on the cell of the effective signal, which enables the mobile terminal to find, as far as possible during cell reselection or cell handover, a cell to camp on, and avoid entering a no-service state.

In the prior art, if there is a cell whose other aspect meets a match condition for access but whose signal strength is slightly weak (which does not meet the standard cell access criterion), the mobile terminal cannot camp on the cell. However, in the solution of this embodiment of the present disclosure, a cell whose other aspect meets the match condition for connection but whose signal strength is slightly weak can be selected from the cells, and signal compensation is performed on a signal of the cell such that the cell can provide a network service for a user.

Figure 1B:
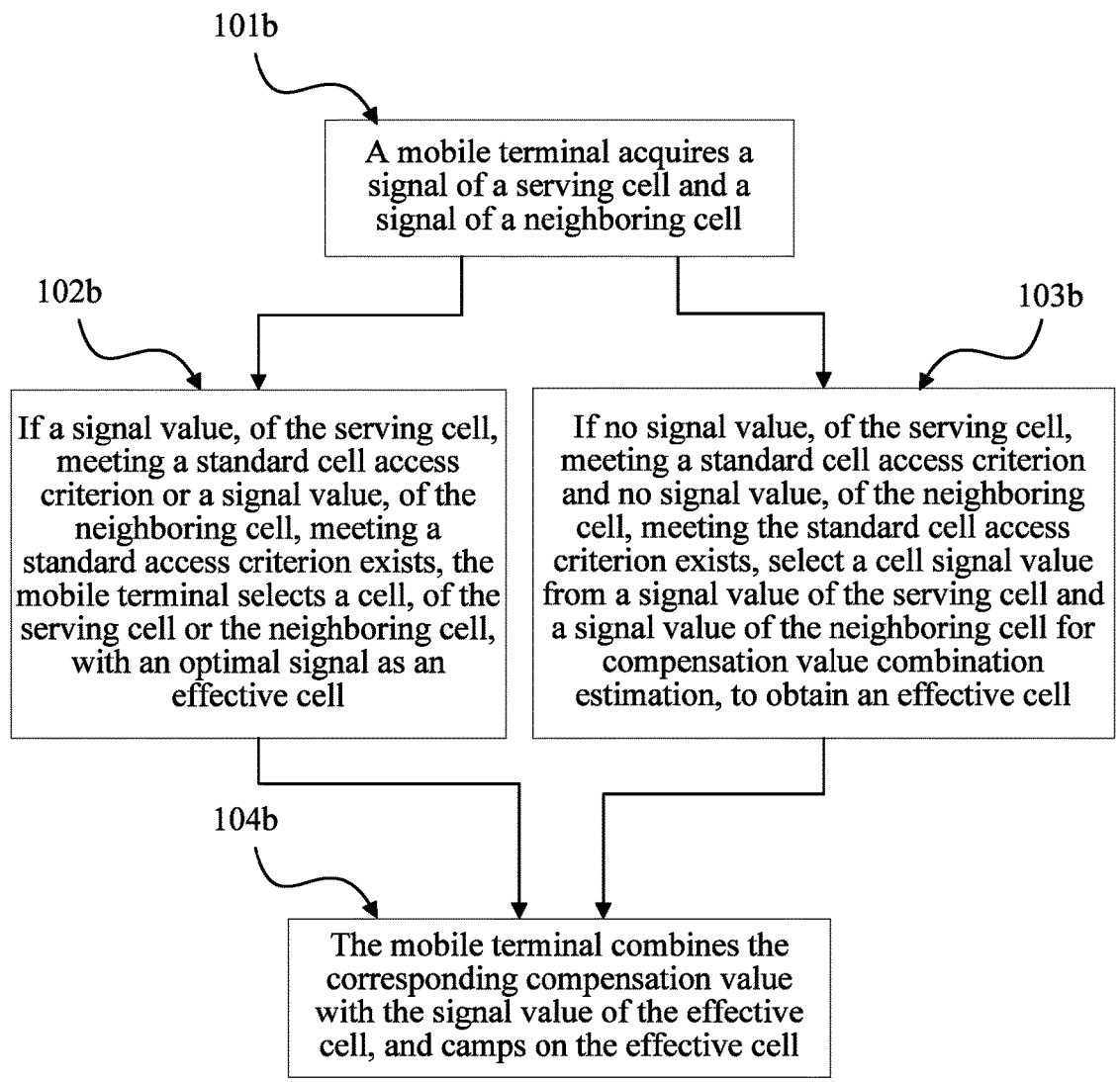
FIG. 1B is a flowchart of another method for a terminal to camp on a cell according to an embodiment of the present disclosure.

According to another aspect, as shown in FIG. 1B, an embodiment of the present disclosure further provides a method for a terminal to camp on a cell, including:

101B. A mobile terminal acquires a signal of a serving cell and a signal of a neighboring cell.

102B. If a signal value of the serving cell meeting a standard cell access criterion or a signal value of the neighboring cell meeting a standard access criterion exists, the mobile terminal selects a cell, of the serving cell or the neighboring cell, with an optimal signal as an effective cell.

For example, the serving cell or the neighboring cell that corresponds to an optimal signal value is used as the effective cell, where the optimal signal is selected from the signal value of the serving cell meeting the standard cell access criterion and the signal value of the neighboring cell meeting the standard access criterion.

103B. If no signal value of the serving cell meeting a standard cell access criterion and no signal value of the neighboring cell meeting the standard cell access criterion exists, select a cell signal value from a signal value of the serving cell and a signal value of the neighboring cell for compensation value combination estimation to obtain an effective cell.

When no cell signal value that meets the standard cell access criterion exists, the mobile terminal selects a cell signal value from the signal value of the serving cell and the signal value of the neighboring cell to perform an operation of compensation value combination estimation. In the estimation operation, a combination calculation is performed on the cell signal value and the compensation value and all calculation results are compared. A cell of a cell signal value with a greatest calculation result is selected as the effective cell.

104b. The mobile terminal combines the corresponding compensation value with the signal value of the effective cell, and camps on the effective cell.

After step 103b of obtaining the effective cell by means of compensation value combination estimation, the mobile terminal performs an operation of combining the compensation value with the received signal value of the effective cell in step 104b, thereby obtaining an enhanced signal of the effective cell, and camps on the effective cell.

The corresponding compensation value is combined with a cell signal of the effective cell for the mobile terminal to camp on.

According to the method for a terminal to camp on a cell provided in this embodiment of the present disclosure, a mobile terminal acquires a signal of a serving cell and a signal of a neighboring cell, and selects a serving cell or a neighboring cell with an optimal signal from a serving cell or a neighboring cell that meets a standard cell access criterion, as an effective cell for the mobile terminal to camp on. Alternatively, when a cell signal value of the serving cell does not meet a standard cell access criterion for a standard cell signal, the mobile terminal selects a cell from the serving cell and the neighboring cell for compensation value combination to obtain an effective cell to camp on such that when the mobile terminal reselects a cell or during cell handover, a success rate of finding a cell that can be camped on is improved, and a possibility of making the mobile terminal enter a no-service state is reduced, thereby facilitating network service provisioning to a user.

FIG. 1A and FIG. 1B separately describe one solution for a terminal to camp on a cell, and the two solutions are separately described below in detail.

Figure 2:
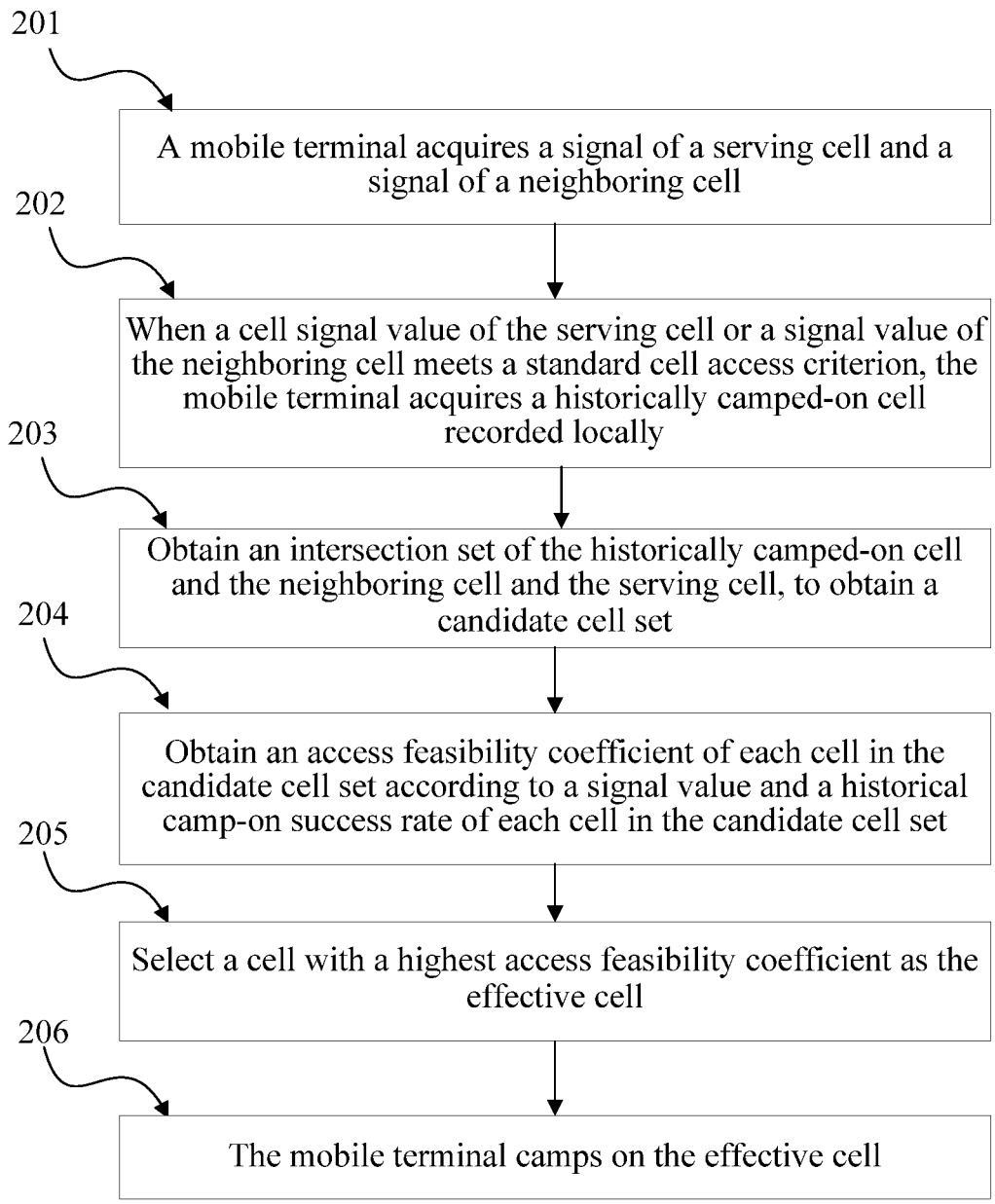
FIG. 2 is a flowchart of another method for a terminal to camp on a cell according to an embodiment of the present disclosure.

As shown in FIG. 2, an embodiment of the present disclosure provides a method for a terminal to camp on a cell, the method including the following steps.

201. A mobile terminal acquires a signal of a serving cell and a signal of a neighboring cell.

202. When a cell signal value of the serving cell or a signal value of the neighboring cell meets a standard cell access criterion, the mobile terminal acquires data regarding historically camped-on cells recorded locally, or information about cells that the mobile terminal has previously camped-on that is recorded locally.

When neither the cell signal value of the serving cell nor the signal value of the neighboring cell meets the standard cell access criterion, the mobile terminal enters a no-service state.

203. Obtain an intersection set of the historically camped-on cell, the neighboring cell and the serving cell to obtain a candidate cell set. The intersection set may indicate which cells of the historically camped-on cells are also a cell of the neighboring cell and the serving cell.

204. Obtain an access feasibility coefficient of each cell in the candidate cell set according to a signal value and a historical camp-on success rate of each cell in the candidate cell set.

Optionally, the access feasibility coefficient is obtained according to signal value strength and the historical camp-on success rate of each cell, where the historical camp-on success rate=a quantity of camp-on successes/(a quantity of camp-on failures+the quantity of camp-on successes).

For example, assuming a signal value of a cell n is $P_n$, a historical camp-on success rate is $S_n$, a weighting factor k1 is allocated to a signal strength value, and a weighting factor k2 is allocated to a historical camp-on success rate, then using a formula, $k1*P_n+k2*S_n$, a weighted sum, that is, an access feasibility coefficient, of the cell n can be obtained. A cell with a greatest weighted sum is selected from N cells in a candidate cell set as an effective cell to camp on. In actual application, according to different communication scenarios, an engineer can select a suitable weighting factor through a limited quantity of experiments in order to balance a proportional relationship between signal value strength and a historical camp-on success rate.

205. Select a cell with a highest access feasibility coefficient as an effective cell.

206. The mobile terminal camps on the effective cell.

In the mobile terminal, a data table may be created, as shown in table 1.

TABLE 1

| Global cell identity | Quantity of camp-on successes | Quantity of camp-on failures |
| --- | --- | --- |
| ID1 | Success1 | Fail1 |
| ID2 | Success2 | Fail2 |
| ... | | |
| IDn | Success3 | Fail3 |

When the mobile terminal camps on a cell for the first time, the cell that is camped on is recorded in the mobile terminal. For example, when camping on a cell whose global cell identity is ID1, the mobile terminal detects whether ID1 already exists in the data table, and if ID1 does not exist, adds an entry to Table 1, records the global cell identity ID1, and sets a quantity of camp-on successes Success1 to 1. Afterward, if the mobile terminal is transferred, due to a connection failure or cell handover, from of the cell ID1 to another cell to camp on, 1 is added to Fail 1; if the mobile terminal re-camps on the cell ID1, 1 is added to a quantity of camp-on successes Success1. In this way, an accumulated value of a quantity of camp-on successes and an accumulated value of a quantity of camp-on failures can be obtained. In this way, when the foregoing step 204 is performed, a quantity of camp-on successes and a quantity of camp-on failures of each cell recorded in Table 1 are acquired, and a camp-on success rate is calculated.

In an actual application, if a user restores the mobile terminal to factory settings, the mobile terminal clears the data table during a factory settings restoration process. When the mobile terminal is powered off or in a flight mode, content of the data table may be written to a non-volatile random access memory in order to save the content of the data table. After the mobile terminal is powered on or the flight mode is canceled, the data table is read from the non-volatile random access memory.

In the technical solution provided in this embodiment of the present disclosure, a historically camped-on cell, a quantity of camp-on successes, and a quantity of camp-on failures are recorded in a mobile terminal. A cell, in a candidate cell set, with a relatively high camp-on success rate is selected, with reference to a signal value strength of the cell, as an effective cell to camp on, thereby implementing access of the mobile terminal. In particular, in a prosperous area with relatively heavy cell load and an area with heavy traffic, not only cell signal value strength is considered, but a historical camp-on success rate is also further introduced in selecting a cell. Selecting a cell with reference to a signal value strength and a historical camp-on success rate can reduce a quantity of failures that may be caused when cell access is performed randomly, which not only improves service quality, but also can save resources.

Figure 3:
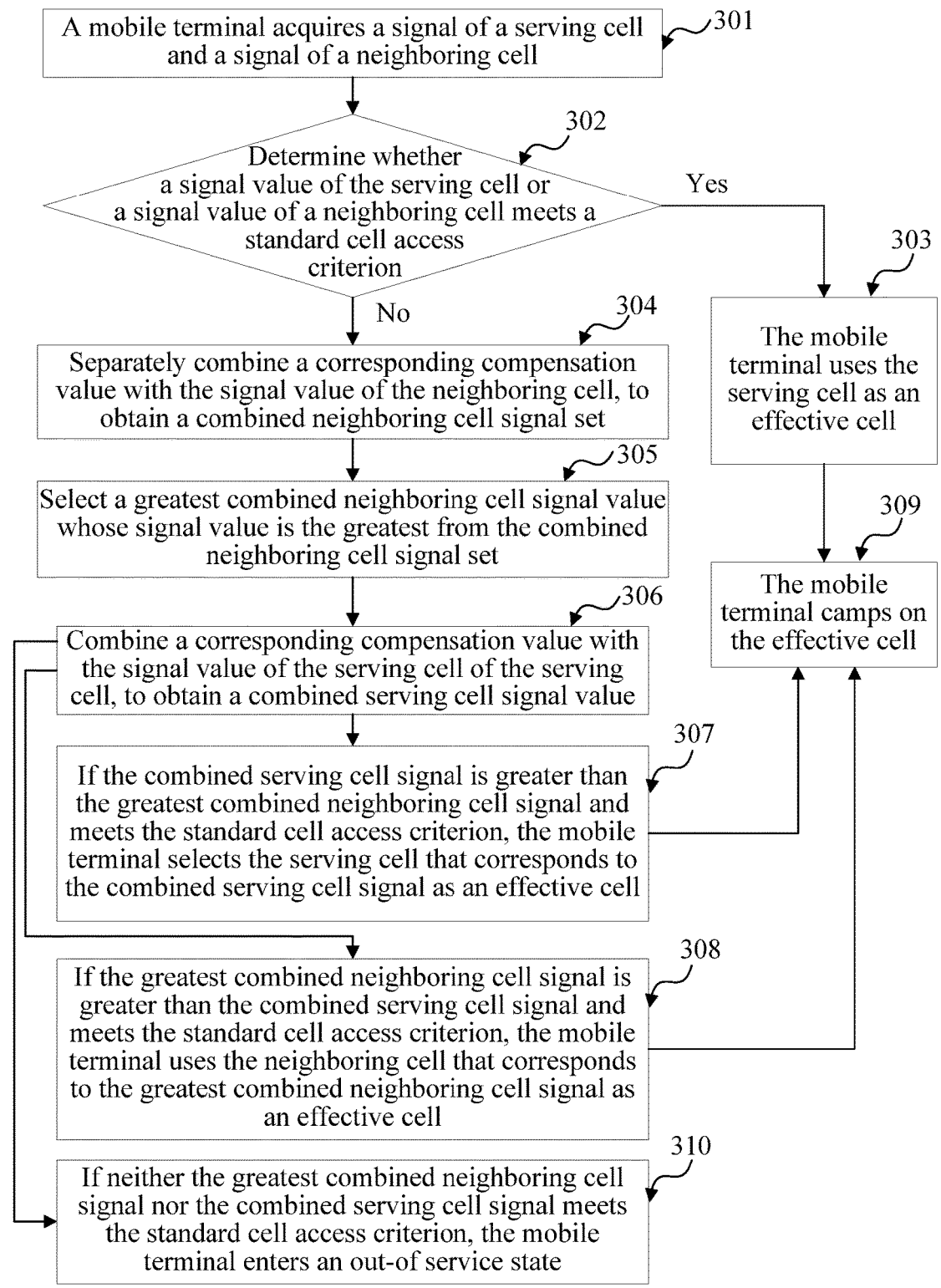
FIG. 3 is a flowchart of another method for a terminal to camp on a cell according to an embodiment of the present disclosure.

According to another aspect, an embodiment of the present disclosure further provides a method for a terminal to camp on a cell, which, as shown in FIG. 3, the method includes the following steps.

301. A mobile terminal acquires a signal of a serving cell and a signal of a neighboring cell.

302. Determine whether a signal value of the serving cell or a signal value of a neighboring cell meets a standard cell access criterion.

According to a standard in the prior art, a mobile terminal periodically triggers reselection detection, and an objective of determining whether a cell signal value meets a standard cell access criterion is to find a cell with an optimal signal. If the cell with an optimal signal is the neighboring cell, the mobile terminal performs a reselection action, and camps on the neighboring cell. If the cell with an optimal signal is still the current serving cell, the mobile terminal still camps on the current serving cell.

If neither the signal value of the serving cell nor the signal value of the neighboring cell meets the standard cell access criterion for a standard cell signal, step 304 is performed. Otherwise, step 303 is performed and then step 309 is performed.

303. The mobile terminal uses the serving cell or the neighboring cell as an effective cell.

When there are at least two cells whose signal values meet the standard cell access criterion, a cell with an optimal signal may be selected as the effective cell.

As described in step 303, if the signal value in the serving cell or the neighboring cell meets the standard cell access criterion, subsequent steps 304 to step 308 and step 310 do not need to be performed.

When a signal value of at least one cell in the serving cell or the neighboring cell meets the standard cell access criterion, step 303 is performed. A cell whose signal value meets the standard cell access criterion is selected as the effective cell.

304. Separately combine a corresponding compensation value with the signal value of the neighboring cell, to obtain a combined neighboring cell signal value set.

For example, if the signal value of the neighboring cell is S1, and the compensation value is C, a signal value of the neighboring cell after combination is S1+C.

The compensation value is preset in the mobile terminal.

In one embodiment, the compensation value is adjusted according to a network access threshold delivered by a network. For example, the compensation value may be set to be the network access threshold or greater than the network access threshold. In a WCDMA system, the network access threshold is set to Qqualmin, and in a GSM system, the network access threshold is set to rxlev_access_min.

305. Select a greatest combined neighboring cell signal value whose signal value is the greatest from the combined neighboring cell signal value set.

306. Combine a corresponding compensation value with the signal value of the serving cell of the serving cell to obtain a combined serving cell signal value.

Step 306 may be performed before step 304, or may be performed after step 304.

307. If the combined serving cell signal value is greater than the greatest combined neighboring cell signal value and meets the standard cell access criterion, the mobile terminal selects the serving cell that corresponds to the combined serving cell signal value as an effective cell.

For example, in the WCDMA system, the greatest combined neighboring cell signal is Rank_n, and the combined serving cell signal is Rank_s. When Rank_n<Rank_s, and Squal>0, the mobile terminal uses the serving cell that corresponds to the combined serving cell signal as the effective cell.

A Squal criterion is mentioned in the foregoing content of the embodiments of the present disclosure. When being specifically applied in the WCDMA system, the criterion may be considered as a Squal value. For a specific description of the Squal criterion, reference may be made to subclause 5.2.3.1.2 in the 3gpp protocol TS 25.304, which is hereby incorporated by reference in its entirety.

In a GSM, a greatest combined neighboring cell signal is NC2, and a combined serving cell signal is SC2. When NC2<SC2, and C1>0, the mobile terminal uses a serving cell that corresponds to the combined serving cell signal as the effective cell.

The C1 criterion is mentioned in the foregoing content of the embodiments of the present disclosure. When being specifically applied in the GSM system, the criterion may be considered as a C1 value. For a specific description, reference may be made to subclause 6.4 in the 3gpp protocol TS05.08, which is hereby incorporated by reference in its entirety.

After step 307, step 309 is performed.

308. If the greatest combined neighboring cell signal value is greater than the combined serving cell signal value and meets the standard cell access criterion, the mobile terminal uses the neighboring cell that corresponds to the greatest combined neighboring cell signal value as an effective cell.

For example, in WCDMA, a greatest combined neighboring cell signal is Rank_n, and a combined serving cell signal is Rank_s. When Rank_n<Rank_s, and Squal>0, the mobile terminal uses a neighboring cell that corresponds to the greatest combined neighboring cell signal as the effective cell.

In a GSM, a greatest combined neighboring cell signal is NC2, and a combined serving cell signal is SC2. When NC2>SC2, and C1>0, the mobile terminal uses a neighboring cell that corresponds to the greatest combined neighboring cell signal as the effective cell.

After step 308, step 309 is performed.

In step 304 to step 306, a process in which the compensation value is separately combined with the signal value of the neighboring cell and an access value of the serving cell to obtain the greatest combined neighboring cell signal and the combined serving cell signal is described. Afterward, in step 307, that the combined serving cell signal meets the standard cell access criterion and the combined serving cell signal is greater than the greatest combined neighboring cell signal indicates that the combined serving cell signal can provide an access signal. Therefore, the mobile terminal uses the serving cell that corresponds to the combined serving cell signal as the effective cell, and prepares to camp on the effective cell. In step 308, that the greatest combined neighboring cell signal meets the standard cell access criterion and the greatest combined neighboring cell signal is greater than the combined serving cell signal indicates that the greatest combined neighboring cell signal can provide a connection signal. Therefore, the mobile terminal uses the neighboring cell that corresponds to the greatest combined neighboring cell signal as the effective cell, and prepares to camp on the effective cell.

Step 304 to step 308 are specific detailed description of compensation value combination estimation in FIG. 1B.

309. The mobile terminal camps on the effective cell.

When the mobile terminal camps on the effective cell, the mobile terminal needs to combine a compensation value that corresponds to the effective cell in order to compensate for a problem that an original signal value of the cell is less than the standard cell access criterion. For specific description of combination, reference may be made to the foregoing description of step 304 in this embodiment of the present disclosure.

In addition to the two cases in 307 and 308, another case may further occur:

310. If neither the greatest combined neighboring cell signal nor the combined serving cell signal value meets the standard cell access criterion, the mobile terminal enters a no-service state. In this case, neither the serving cell nor the neighboring cell is suitable for the mobile terminal to camp on. At this time, the mobile terminal enters a no-service state, and after waiting for a period of time, re-initiates the process in FIG. 3. For example a timer may be set in the mobile terminal, and when a preset duration of the timer expires, the process in FIG. 3 is re-initiated.

It should be noted that when the mobile terminal is in a serving cell, there are multiple neighboring cells around the serving cell. The mobile terminal traverses all the neighboring cells to determine whether there is an effective cell that can be camped on.

Because combination of a compensation value may cause distortion of a signal, when an original signal value is not less than the standard cell access criterion, provision of a compensation value may be stopped. For example, a timer T_Optm may be set in a terminal, and after step 305, step 306, or step 307, the timer T_Optm is started for timing. Assuming that timing duration is 30 seconds, when the 30 seconds expire, the terminal redetects a cell signal of a serving cell. At this time, if a result obtained through calculation according to a Squal/C1 criterion of the signal of the serving cell is greater than a network access threshold (such as Qqualmin and rxlev_access_min described above), the terminal may stop providing a compensation value, and access the serving cell in a default manner. To ensure further accuracy of the result, the result obtained through calculation according to the Squal/C1 criterion of the signal of the serving cell not only is greater than the network access threshold, but also should be greater than a sum of the network access threshold and an adjustment value. At this time, the terminal may stop providing a compensation value and access the serving cell in a default manner, where the adjustment value may be set to 5 dbm.

According to the method for a terminal to camp on a cell provided in this embodiment of the present disclosure, combination estimation is separately performed on a signal value of a neighboring cell and an access value of a serving cell using a compensation value, to obtain a greatest combined neighboring cell signal value and a combined serving cell signal value, a relationship between the greatest combined neighboring cell signal value and a standard cell access criterion is compared with a relationship between the combined serving cell signal value and the standard cell access criterion, to select an effective cell to camp on such that when the mobile terminal reselects a cell or during cell handover, a possibility of camping on a cell is improved, and a possibility of making the mobile terminal enter a no-service state is reduced, thereby facilitating network service provisioning to a user.

Figure 5:
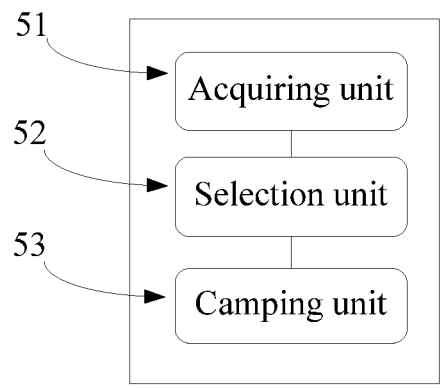
FIG. 5 is a block diagram of an apparatus for a terminal to camp on a cell according to an embodiment of the present disclosure.

According to another aspect, an embodiment of the present disclosure further provides an apparatus for a terminal to camp on a cell. As shown in FIG. 5, the apparatus includes an acquiring unit 51 configured to acquire a signal of an available cell, where when a mobile terminal is not camped on a serving cell, the signal of the available cell includes a signal, detected by the mobile terminal, of a cell, or when the mobile terminal camps on the serving cell, the signal of the available cell includes a signal of the serving cell and a signal of a neighboring cell of the serving cell, a selection unit 52 configured to, if a cell signal value of the available cell meets a standard cell access criterion, select an effective cell from the available cell according to signal strength and a historical camp-on success rate, and a camping unit 53 configured to camp on the effective cell.

The standard cell signal is stipulated by Third Generation Partnership Project (3GPP).

Figure 6:
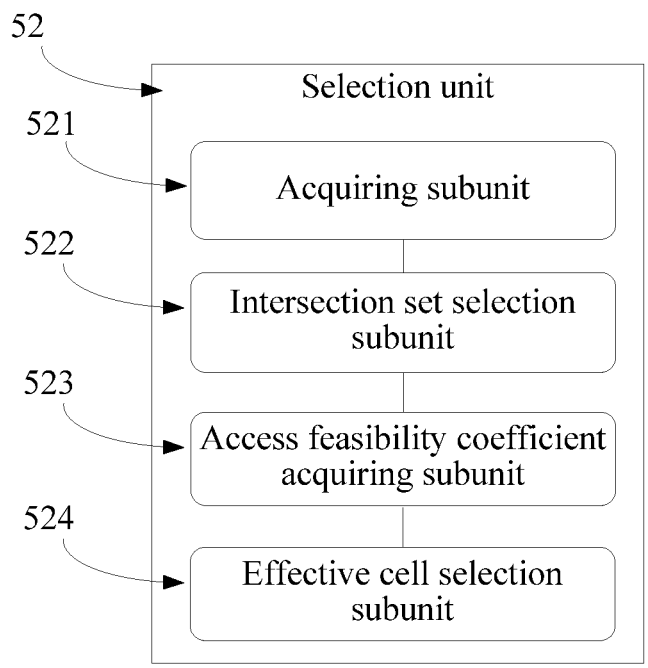
FIG. 6 is a structural block diagram of a selection unit according to an embodiment of the present disclosure.

Further, in an implementation manner of this embodiment of the present disclosure, as shown in FIG. 6, the selection unit 52 specifically includes an acquiring subunit 521 configured to acquire a historically camped-on cell recorded locally, an intersection set selection subunit 522 configured to obtain an intersection set of the historically camped-on cell acquired by the acquiring subunit 521 and the available cell, to obtain a candidate cell set, an access feasibility coefficient acquiring subunit 523, configured to obtain an access feasibility coefficient of each cell in the candidate cell set according to a signal value and a historical camp-on success rate of each cell in the candidate cell set, where the access feasibility coefficient is obtained according to signal value strength and the historical camp-on success rate of each cell, and an effective cell selection subunit 524 configured to select a cell with a highest access feasibility coefficient as the effective cell, where a historical camp-on success rate=a quantity of camp-on successes/(a quantity of camp-on failures+the quantity of camp-on successes).

Figure 7:
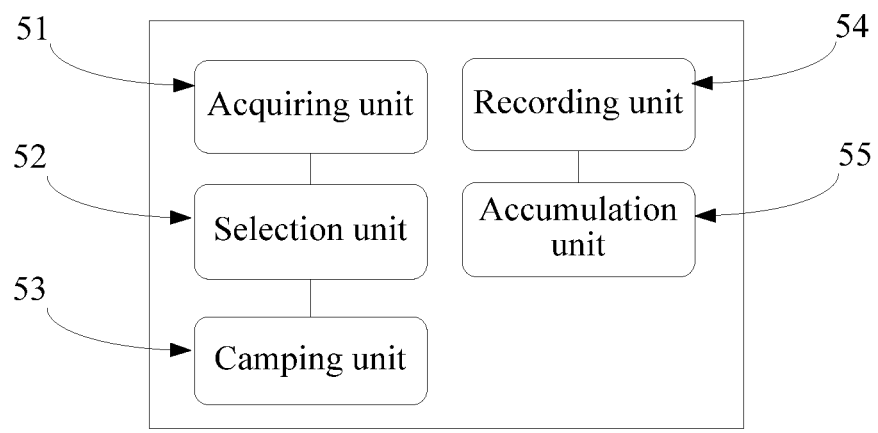
FIG. 7 is a block diagram of another apparatus for a terminal to camp on a cell according to an embodiment of the present disclosure.

Further, as shown in FIG. 7, the apparatus includes a recording unit 54 configured to, when the mobile terminal camps on a cell successfully for a first time, record the camped-on cell on which the mobile terminal successfully camps, and set a quantity of camp-on successes for the camped-on cell to 1, and an accumulation unit 55 configured to, each time the camped-on cell is successfully camped on, add 1 to a quantity of camp-on successes for the camped-on cell, where the accumulation unit 55 is further configured to each time the camped-on cell fails to be camped on, add 1 to a quantity of camp-on failures for the camped-on cell.

According to the apparatus for a terminal to camp on a cell provided in this embodiment of the present disclosure, a mobile terminal acquires a cell signal of an available cell. When a cell signal value of the available cell meets a standard cell access criterion, the mobile terminal selects an effective cell from the available cell with reference to a signal strength and a historical camp-on success rate, and camps on the effective cell. Using the solution, a terminal can comprehensively consider signal value strength and a historical camp-on success rate of a cell in selecting an effective cell such that when the mobile terminal selects a cell for a first time or reselects a cell, a success rate of finding a cell that can be camped on is improved, and a possibility of making the mobile terminal enter a no-service state is reduced, thereby facilitating network service provisioning to a user.

In particular, in a prosperous area with relatively heavy cell load and an area with heavy traffic, not only is cell signal value strength is considered, but a historical camp-on success rate is also further introduced in selecting a cell. Selecting a cell with reference to signal value strength and a historical camp-on success rate can reduce a quantity of failures that may be caused when cell access is performed randomly, which not only improves service quality, but also can save resources.

Figure 10:
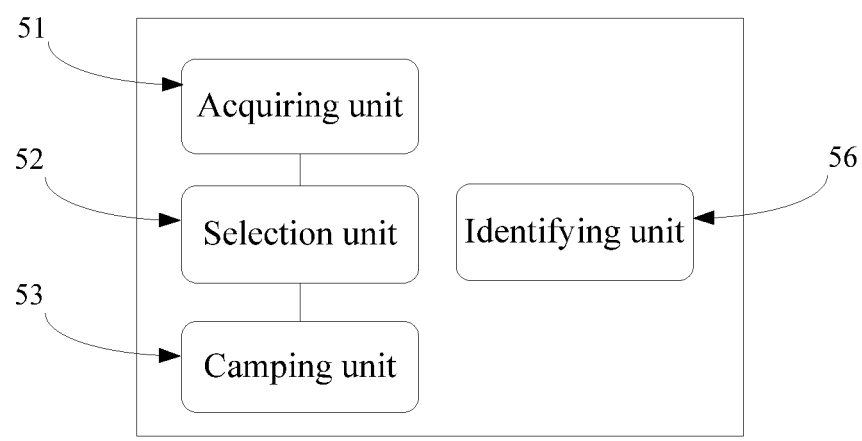
FIG. 10 is a structural block diagram of another apparatus for a terminal to camp on a cell according to an embodiment of the present disclosure.

In another implementation case of the present disclosure, as shown in FIG. 10, the apparatus further includes an identifying unit 56 configured to, if the cell signal value of the available cell does not meet the standard cell access criterion, identify the available cell that does not meet the standard cell access criterion; where the selection unit 52 is further configured to, when no cell whose cell signal value meets the standard cell access criterion is found after all cells are traversed, use the identified cell as the effective cell and the camping unit 53 is further configured to combine a compensation value with the signal value of the effective cell, and camp on the effective cell, where the compensation value is preset in the mobile terminal.

According to the apparatus for a terminal to camp on a cell provided in this embodiment of the present disclosure, a mobile terminal identifies an available cell that does not meet a standard cell access criterion and obtains an effective signal by combining a compensation value with a signal of the identified cell in order to camp on the cell of the effective signal, which enables the mobile terminal to find, as far as possible during cell reselection or cell handover, a cell to camp on, and avoid entering a no-service state.

Figure 8:
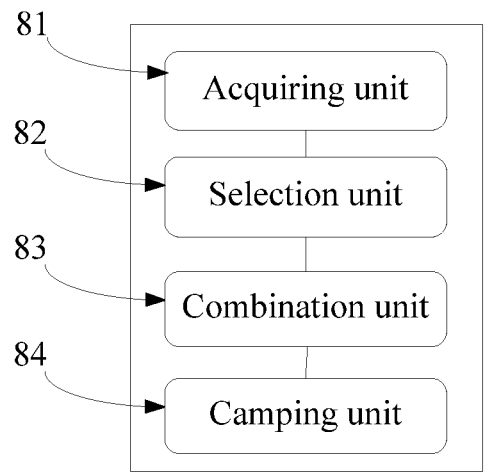
FIG. 8 is a block diagram of another apparatus for a terminal to camp on a cell according to an embodiment of the present disclosure.

In addition, an embodiment of the present disclosure further provides an apparatus for a terminal to camp on a cell, which, as shown in FIG. 8, includes an acquiring unit 81 configured to acquire a signal of a serving cell and a signal of a neighboring cell, a selection unit 82 configured to, when a signal value of the serving cell meeting a standard cell access criterion or a signal value of the neighboring cell meeting a standard access criterion exists, use a cell, of the serving cell or the neighboring cell, with an optimal signal as an effective cell, a combination unit 83 configured to, when no signal value of the serving cell meeting a standard cell access criterion and no signal value of the neighboring cell meeting the standard cell access criterion exists, select a cell signal value from a signal value of the serving cell and a signal value of the neighboring cell for compensation value combination estimation to obtain an effective cell, and a camping unit 84 configured to combine the corresponding compensation value with the signal value of the effective cell, and camp on the effective cell.

Figure 9:
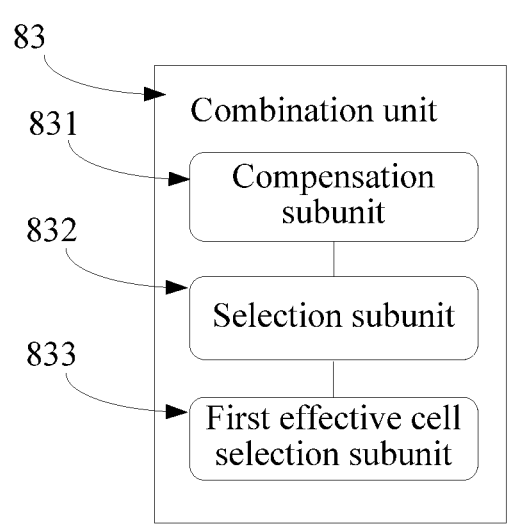
FIG. 9 is a structural block diagram of a combination unit according to an embodiment of the present disclosure.

Further, as shown in FIG. 9, the combination unit 83 includes a compensation subunit 831 configured to separately combine a corresponding compensation value with the signal value of the neighboring cell to obtain a combined neighboring cell signal value set, where the compensation value is preset in the mobile terminal, a selection subunit 832 configured to select a greatest combined neighboring cell signal value whose signal value is the greatest from the combined neighboring cell signal value set obtained by the compensation subunit, where the compensation subunit 831 is further configured to combine a corresponding compensation value with the signal value of the serving cell, to obtain a combined serving cell signal value, and a first effective cell selection subunit 833 configured to, when the combined serving cell signal value meets the standard cell access criterion and the combined serving cell signal value is greater than the greatest combined neighboring cell signal value, select the serving cell that corresponds to the combined serving cell signal value as the effective cell, where the first effective cell selection subunit 833 is further configured to, when the greatest combined neighboring cell signal value meets the standard cell access criterion and the greatest combined neighboring cell signal value is greater than the combined serving cell signal value, use the neighboring cell that corresponds to the greatest combined neighboring cell signal value as the effective cell.

According to the apparatus for a terminal to camp on a cell provided in this embodiment of the present disclosure, a mobile terminal acquires a signal of a serving cell and a signal of a neighboring cell, and when a signal value of the serving cell meeting a standard cell access criterion or a signal value of the neighboring cell meeting a standard access criterion exists, uses a cell, of the serving cell or the neighboring cell, with an optimal signal as an effective cell, or when no signal value of the serving cell meeting a standard cell access criterion and no signal value of the neighboring cell meeting the standard cell access criterion exists, selects a cell signal value from a signal value of the serving cell and a signal value of the neighboring cell for compensation value combination estimation, to obtain an effective cell, and camps on the effective cell such that when the mobile terminal reselects a cell or during cell handover, a success rate of camping on a cell is improved, and a possibility of making the mobile terminal enter a no-service state is reduced, thereby facilitating network service provisioning to a user.

Figure 11:
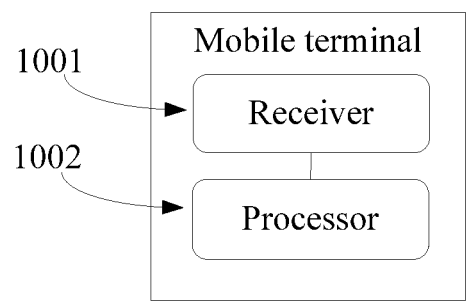
FIG. 11 is a block diagram of a mobile terminal for a terminal to camp on a cell according to an embodiment of the present disclosure.

According to still another aspect, an embodiment of the present disclosure further provides a mobile terminal for a terminal to camp on a cell. As shown in FIG. 11, the mobile terminal includes a receiver 1001 configured to acquire a signal of an available cell, where when the mobile terminal is not camped on a serving cell, the signal of the available cell includes a signal, detected by the mobile terminal, of a cell, or when the mobile terminal camps on the serving cell, the signal of the available cell includes a signal of the serving cell and a signal of a neighboring cell of the serving cell, and a processor 1002, configured to, if a cell signal value of the available cell meets a standard cell access criterion, select an effective cell from the available cell according to signal strength and a historical camp-on success rate, where the processor 1002 is further configured to camp on the effective cell.

Further, the processor 1002 is further configured to acquire a historically camped-on cell recorded locally, obtain an intersection set of the historically camped-on cell and the available cell to obtain a candidate cell set, obtain an access feasibility coefficient of each cell in the candidate cell set according to a signal value and a historical camp-on success rate of each cell in the candidate cell set, where a historical camp-on success rate=a quantity of camp-on successes/(a quantity of camp-on failures+the quantity of camp-on successes), and select a cell with a highest access feasibility coefficient as the effective cell.

According to the mobile terminal provided in this embodiment of the present disclosure, a mobile terminal acquires a signal of a serving cell and a signal of a neighboring cell, when a cell signal value of the serving cell or a signal value of the neighboring cell meets a standard cell access criterion, the mobile terminal selects, with reference to signal strength and a historical camp-on success rate, an effective cell from the serving cell and the neighboring cell, and camps on the effective cell. Using the solution, in a prosperous area with relatively heavy cell load and an area with heavy traffic, not only is cell signal value strength considered, but a historical camp-on success rate is also further introduced in selecting a cell. Selecting a cell with reference to signal value strength and a historical camp-on success rate can reduce a quantity of failures that may be caused when cell access is performed randomly, which not only improves service quality, but also can save resources.

In another case, the processor 1002 is further configured to, when the cell signal value of the available cell does not meet the standard cell access criterion, identify the available cell that does not meet the standard cell access criterion, and, when no cell whose cell signal value meets the standard cell access criterion is found after all cells are traversed, use the identified cell as the effective cell. Then the processor 1002 combines a compensation value with the signal value of the effective cell, and camps on the effective cell, where the compensation value is preset in the mobile terminal.

The mobile terminal identifies the available cell that does not meet the standard cell access criterion, obtains an effective signal by combining a compensation value with a signal of the identified cell, and therefore, camps on the cell of the effective signal, which enables the mobile terminal to find, as far as possible during cell reselection or cell handover, a cell to camp on, and avoid entering a no-service state.

In addition, in another mobile terminal provided in an embodiment of the present disclosure, the processor 1002 may further be configured to, when a signal value of the serving cell meeting a standard cell access criterion or a signal value of the neighboring cell meeting a standard access criterion exists, use a cell, of the serving cell or the neighboring cell, with an optimal signal as an effective cell. The processor 1002 is further configured to, when no signal value of the serving cell meeting a standard cell access criterion and no signal value of the neighboring cell meeting the standard cell access criterion exists, select a cell signal value from a signal value of the serving cell and a signal value of the neighboring cell for compensation value combination estimation, to obtain an effective cell.

The processor 1002 is further configured to make the mobile terminal camp on the effective cell, where the corresponding compensation value is combined with a cell signal of the effective cell for the mobile terminal to camp on.

The processor 1002 is further configured to separately combine a corresponding compensation value with the signal value of the neighboring cell to obtain a combined neighboring cell signal value set, where the compensation value is preset in the mobile terminal, select a greatest combined neighboring cell signal value whose signal value is the greatest from the combined neighboring cell signal value set, and combine a corresponding compensation value with the signal value of the serving cell to obtain a combined serving cell signal value.

The processor 1002 is further configured to, when the combined serving cell signal value meets the standard cell access criterion and the combined serving cell signal value is greater than the greatest combined neighboring cell signal value, select the serving cell that corresponds to the combined serving cell signal value as the effective cell.

The processor 1002 is further configured to, when the greatest combined neighboring cell signal value meets the standard cell access criterion and the greatest combined neighboring cell signal value is greater than the combined serving cell signal value, use a neighboring cell that corresponds to the greatest combined neighboring cell signal value as an effective cell.

The processor 1002 is further configured to, when neither the greatest combined neighboring cell signal value nor the combined serving cell signal value meets the standard cell access criterion, make the mobile terminal enter a no-service state.

According to the mobile terminal provided in this embodiment of the present disclosure, the mobile terminal acquires a signal of a serving cell and a signal of a neighboring cell, and when a signal value of the serving cell meeting a standard cell access criterion or a signal value of the neighboring cell meeting a standard access criterion exists, use a cell, of the serving cell or the neighboring cell, with an optimal signal as an effective cell. Alternatively, when no signal value of the serving cell meeting a standard cell access criterion and no signal value of the neighboring cell meeting the standard cell access criterion exists, the mobile terminal selects a cell signal value from a signal value of the serving cell and a signal value of the neighboring cell for compensation value combination estimation to obtain an effective cell, and camps on the effective cell such that when the mobile terminal reselects a cell or during cell handover, a success rate of camping on a cell is improved, and a possibility of making the mobile terminal enter a no-service state is reduced, thereby facilitating network service provisioning to a user.

The solutions provided in the embodiments of the present disclosure are applicable to some specific occasions with poor network coverage, for example, an area such as a high-speed railway/highway, a metro, a suburb, a remote rural area, or an underground garage, to improve a capability of a terminal in camping on a cell and improve user experience. In addition, for middle-range and low-end smart phones, the solutions provided in the embodiments of the present disclosure can remedy defects thereof in antenna performance or sensitivity such that the smart phones camp on a network more rapidly, thereby improving product competitiveness. Moreover, the improvement of the capability of the terminal in camping on a cell can reduce time for searching a network to some extent and reduce power consumption, thereby improving battery life of the terminal.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for a mobile terminal to camp on a cell, comprising:
  acquiring, by the mobile terminal, a signal of an available cell;
  after acquiring the signal of the available cell, selecting, by the mobile terminal, an effective cell from the available cell as a camped-on cell based on a determination that a cell signal value of the available cell meets a standard cell access criterion, wherein selecting the effective cell from the available cell comprises:
    acquiring locally recorded data regarding historically camped-on cells;
    obtaining a candidate cell set using an intersection set of the locally recorded data and the signal of the available cell;
    obtaining an access feasibility coefficient for each cell in the candidate cell set according to each cell signal value of each of the cells in the candidate cell set and a historical camp-on success rate of each of the cells in the candidate cell set,
    wherein the historical camp-on success rate of each of the cells in the candidate cell set is a quantity of camp-on successes of each of the cells / (a quantity of camp-on failures of each of the cells + the quantity of camp-on successes of each of the cells); and
    selecting a candidate cell from the candidate cell set with a highest access feasibility coefficient as the effective cell; and
  camping, by the mobile terminal, on the effective cell.

2. The method according to claim 1, further comprising:
  storing a record of the effective cell as a camped-on cell when the mobile terminal successfully camps on the effective cell for a first time; and
  setting a first quantity of camp-on successes for the camped-on cell to a value of 1 when the mobile terminal successfully camps on the camped-on cell for a first time;
  adding a value of 1 to the first quantity of camp-on successes for the camped-on cell each time the camped-on cell is successfully camped on, and
  adding a value of 1 to a first quantity of camp-on failures for the camped-on cell each time the camped-on cell is unsuccessfully camped on.

3. The method according to claim 1, further comprising:
  identifying a second available cell when a second cell signal value of the second available cell does not meet the standard cell access criterion;
  using the identified second available cell as the effective cell when a third cell with a third cell signal value meeting the standard cell access criterion is not found after all the available cells are traversed;
  combining, by the mobile terminal, a compensation value with the second signal value of the effective cell; and
  camping on the effective cell, wherein the compensation value is preset in the mobile terminal.

4. The method according to claim 1, wherein the signal of the available cell comprises either a signal of at least one first cell when the mobile terminal is not camped on a serving cell or each of a signal of the serving cell and a signal of a neighboring cell that neighbors the serving cell when the mobile terminal is camped on the serving cell.

5. A method for a terminal to camp on a cell, comprising:
  acquiring, by a mobile terminal, a first signal of a serving cell and a second signal of a neighboring cell;
  selecting, by the mobile terminal, a cell with an optimal signal value as an effective cell from one of the serving cell or the neighboring cell when at least one of a first signal value of the serving cell or a second signal value of the neighboring cell meets a standard access criterion;
  selecting, by the mobile terminal, a cell signal value from each of the first signal value and the second signal value for an estimation of a compensation value combination to obtain the effective cell when each of the first signal value and the second signal value does not meet the standard cell access criterion; and
  camping on the effective cell,
  wherein the estimation of the compensation value combination comprises:
    separately combining a corresponding compensation value with the second signal value to obtain a combined neighboring cell signal value set, wherein the corresponding compensation value is preset in the mobile terminal;
    selecting a greatest combined neighboring cell signal value with a greatest cell signal value from the combined neighboring cell signal value set;
    combining the corresponding compensation value with the first signal value to obtain a combined serving cell signal value; and
    either selecting, by the mobile terminal, the serving cell with a serving cell signal value that corresponds to the combined serving cell signal value as the effective cell when the combined serving cell signal value is both greater than the greatest combined neighboring cell signal value and meets the standard cell access criterion; or
    selecting, by the mobile terminal, the neighboring cell with a neighboring cell signal value that corresponds to the greatest combined neighboring cell signal value as the effective cell when the greatest combined neighboring cell signal value is both greater than the combined serving cell signal value and meets the standard cell access criterion.

6. The method according to claim 5, further comprising entering, by the mobile terminal, a no-service state when neither the greatest combined neighboring cell signal value nor the combined serving cell signal value meets the standard cell access criterion.

7. A mobile terminal, comprising:
  a processor; and
  a receiver coupled to the processor and configured to acquire a signal of an available cell
  wherein the processor is configured to:
    after acquiring the signal of the available cell, select an effective cell from the available cell as a camped-on cell when a cell signal value of the available cell meets a standard cell access criterion,
    acquire locally recorded data regarding historically camped-on cells;

obtain a candidate cell set using an intersection set of the locally recorded data and the signal of the available cell;

obtain an access feasibility coefficient for each cell in the candidate cell set according to each cell signal value of each of the cells in the candidate cell set and a historical camp-on success rate of each of the cells in the candidate cell set, wherein the historical camp-on success rate of each of the cells in the candidate cell set is equal to a quantity of camp-on successes of each of the cells/ (a quantity of camp-on failures of each of the cells + the quantity of camp-on successes of each of the cells); and select a candidate cell from the candidate cell set with a highest access feasibility coefficient as the effective cell; and cause the mobile terminal to camp on the effective cell.

8. The mobile terminal according to claim 7, wherein the processor is further configured to:

store a record of the effective cell as a camped-on cell when the mobile terminal successfully camps on the effective cell for a first time;

set a first quantity of camp-on successes for the camped-on cell to a value of 1 when the mobile terminal successfully camps on the camped-on cell for a first time;

add a value of 1 to the first quantity of camp-on successes for the camped-on cell each time the camped-on cell is successfully camped on; and add a value of 1 to a first quantity of camp-on failures for the camped-on cell each time the camped-on cell is unsuccessfully camped on.

9. The mobile terminal according to claim 7, wherein the processor is further configured to:

identify a second available cell when a second cell signal value of the second available cell does not meet the standard cell access criterion;

use the identified second available cell as the effective cell when a third cell with a third cell signal value meeting the standard cell access criterion is not found after all the available cells are traversed;

combine a compensation value with the second signal value of the effective cell; and camp on the effective cell, wherein the compensation value is preset in the mobile terminal.

10. The mobile terminal according to claim 7, wherein the signal of the available cell comprises either a first signal of at least one first cell when the mobile terminal is not camped on a serving cell or each of a second signal of the serving cell and a third signal of a neighboring cell to the serving cell when the mobile terminal is camped on the serving cell.

11. A mobile terminal, comprising:
a processor;
a receiver coupled to the processor and configured to receive a first signal of a serving cell and a second signal of a neighboring cell,
wherein the processor is configured to:

select a cell, with an optimal signal value as an effective cell from one of the serving cell or the neighboring cell when at least one of a first signal value of the serving cell or a second signal value of the neighboring cell meets a standard access criterion;

select a cell signal value from each of the first signal value and the second signal value for an estimation of a compensation value combination to obtain the effective cell when each of the first signal value and the second signal value does not meet the standard cell access criterion; and cause the mobile terminal to camp on the effective cell,
wherein the processor is further configured to estimate the compensation value combination as:

separately combine a corresponding compensation value with the second signal value to obtain a combined neighboring cell signal value set, wherein the corresponding compensation value is preset in the mobile terminal;

select a greatest combined neighboring cell signal value with a greatest cell signal value from the combined neighboring cell signal value set;

combine the corresponding compensation value with the first signal value to obtain a combined serving cell signal value; and either use the serving cell with a serving cell signal value that corresponds to the combined serving cell signal value as the effective cell when the combined serving cell signal value is both greater than the greatest combined neighboring cell signal value and meets the standard cell access criterion; or use the neighboring cell with a neighboring cell signal value that corresponds to the greatest combined neighboring cell signal value as the effective cell when the greatest combined neighboring cell signal value is greater than the combined serving cell signal value and meets the standard cell access criterion.

12. The mobile terminal according to claim 11, wherein the processor is further configured to cause the mobile terminal enter a no-service state when neither the greatest combined neighboring cell signal nor the combined serving cell signal meets the standard cell access criterion.

* * * * *